United States Patent [19]

Sammaritano

[11] 3,873,134

[45] Mar. 25, 1975

[54] APPARATUS FOR JOINING PREFORMED CONDUITS

[76] Inventor: Michael Sammaritano, 910 Manor Ln., Bayshore, N.Y. 11706

[22] Filed: Jan. 4, 1973

[21] Appl. No.: 320,884

[52] U.S. Cl............ 285/137 R, 285/334.3, 285/340, 285/DIG. 11
[51] Int. Cl............................................. F16l 34/00
[58] Field of Search......... 285/137 R, 230, DIG. 11, 285/340, 334.3; 85/36; 277/166, 171, 211, 235; 174/73 R, 75 R, 95, 96

[56] References Cited
UNITED STATES PATENTS

| | | | |
|---|---|---|---|
| 2,890,899 | 6/1959 | Simmons et al.............. | 285/137 R X |
| 3,163,448 | 12/1964 | Franklin......................... | 285/137 R |
| 3,464,308 | 9/1969 | Dohmeier.............................. | 85/36 |
| 3,574,356 | 4/1971 | Salerno et al............... | 285/137 R X |
| 3,606,395 | 9/1971 | Salerno et al.................... | 285/137 R |
| 3,711,127 | 1/1973 | Roffa.............................. | 285/137 R |

Primary Examiner—Dave W. Arola
Attorney, Agent, or Firm—Frank J. Jordan

[57] ABSTRACT

A preformed conduit for underground cables, electrical wires and the like consists of a plurality of pipes encased within an elongated concrete body. The preformed conduit sections are placed in a trench below the normal level of the ground and their longitudinal ends are joined to one another to form continuous ducts within the conduit sections. The longitudinal ends of the preformed conduit sections are joined to one another and sealed in a manner to prevent water or any other foreign material from entering the continuous ducts in which the cables or wires are installed.

7 Claims, 12 Drawing Figures

APPARATUS FOR JOINING PREFORMED CONDUITS

The use of preformed conduit sections for electrical cables and the like overcomes fabrication problems inherent in the presently used poured-in-place concrete multiple ducts bank systems. When the concete is poured in place at the job site the uncertainty of the weather and other seasonal factors of working with concrete results in delays and other dificulties. In addition to the weather, other factors at the job site such as terrain, accessibility and intricate distribution layout contribute to the problems attendant the use of known methods involving pouring concrete in place at the job site.

Conduit sections having ducts therein for the electrical cables, wires and the like are preformed at a manufacturing location and subsequently shipped to the job site where they are readily installed in an open trench, independent of the type of weather conditions and other seasonal factors which adversely affect pouring of concrete at the job site. The preformed conduit sections may be manufactured in standard lengths and sizes to accommodate various multiple duct arrangements and fittings for all forms of direction change may be used in conjunction therewith.

Accordingly, an object of the present invention is to provide apparatus utilizing preformed conduit sections which result in a savings in installation time and overall installation costs, which may be installed in any weather with a minimum disturbance of the job site and which incorporates a design flexibility and adaptability to future additions and revisions.

Another object of the inventions is to provide a water tight sealing arrangement for joining the longitudinal lends of preformed conduits of the type made of concrete and having a plurality of pipes encased within the concrete.

Additional objects, advantages, and features of the invention will become apparent during the course of the following specification when taken in connection of the accompanying drawings in which.

Before explaining the present invention in detail, it is to be understood that the invention is not limited in its application to the details of construction and arrangement of parts illustrated in the accompanying drawings since the invention is capable of other embodiments and of being practiced or being carried out in various ways. Also it is to be understood that the pharseology and terminology employed is for the purpose of discription and not of limitation.

Figure 1:
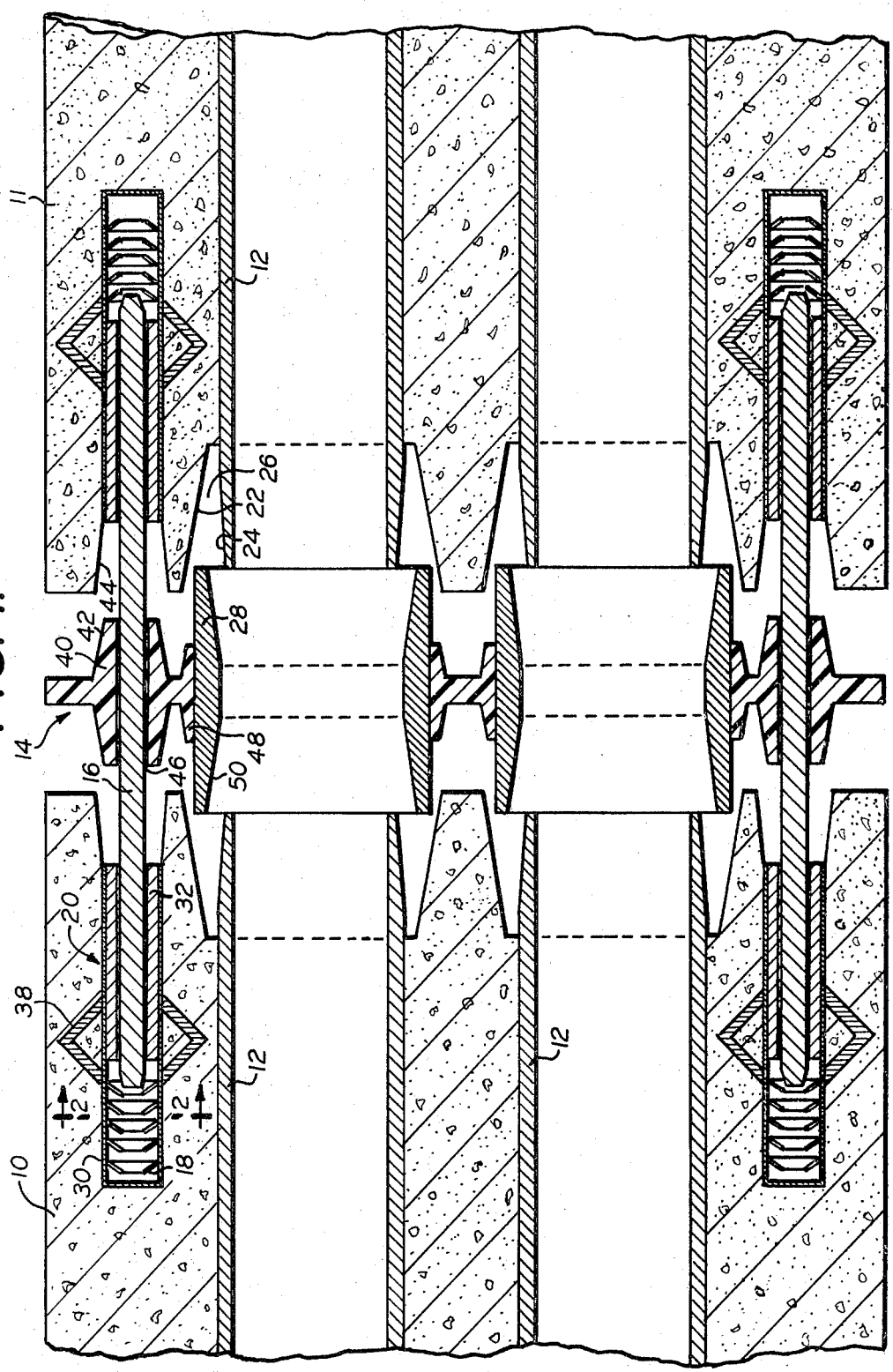
FIG. 1 is a partial, horizontal, longitudinal section showing the ends of two conduit sections which are about to be joined to one another.

Referring to the drawings in which like parts are similarly designated, FIG. 1 shows a pair of preformed conduit sections 10 and 11 which are adapted to be located in a trench. Each of the conduit sections is joined to one another at their longitudinal ends to form a continuous uninterrupted conduit. The conduit sections 10 and 11 may be used in various applications where it is desirous to lay underground cables of wires.

FIG. 1 shows the disposition of the various elements lying in an open trench just before they are about to be finally assembled whereby upon final assembly, the conduit sections, having their longitudinal ends sealed and joined to one another, will be covered and the trench will be filled to form a premanent underground installation for the cables and wires.

Turning to a more detailed description, each conduit section 10 and 11 includes a plurality of pipes 12 which extends parallel to one another but which are spaced from one another so that each pipe 12 may be completely surrounded by concrete. The longitudinal ends of the two conduit sections 10 and 11 are joined to one another utilizing a gasket 14 which provides a water tight seal between the longitudinal ends of the two conduit sections 10 & 11. Also locking means in the form of steel rods 16 and locking washers 18 are disposed in tube means 20 are provided to prevent the two conduit sections 10 and 11 from coming apart once they are assembled as will be further explained.

Each of the pipes 12 in the conduit sections 10, 11 terminate short of the longitudinal end of the conduit section, and frustoconical openings 22 are provided in the concrete of the conduit sections 10, 11 at the longitudinal end of each pipe 12. The longitudinal end of each pipe 12 extends or projects into this frusto-conical section 22 and such extending or projecting ends may be tapered as indicated at 24 in FIG. 1, such taper being in the direction opposite to the taper of the frusto-conical opening 22 within the concrete at the end of each pipe 12. With this arrangement it will be seen that an annular space 26 which gradually narrows is provided between the outer walls of the end section 24 of the pipe 12 and the walls of the frusto-conical opening 24.

Connecting sleeves 28 are utilized to connect two longitudinally aligned pipes 12 in adjacent conduit sections 10, 11. The connecting sleeves 28 may have a central portion having an inner diameter equal to the inner diameter of the pipes 12 which they connect.

Included as part of the structure which is formed before the concrete is poured are a plurality of tube means 20 which form part of the locking means which are utilized to join two conduit sections 10, 11 together as will be explained.

Each tube means 20 comprises an outer tube 30 open at one end and closed at the other. An inner tube 32 is disposed within the outer tube 30 at the open end portions of the latter. The inner tube 32 has an outer diameter equal to or just slightly less than the inner diameter of the outer tube 30 and the inner tube 32 is suitably secured to the outer tube 30 such as by welding or the like.

On the inner end portion of the outer tube 30 are a plurality of locking washers 18. The locking washers 18 have an outer diameter equal to or slightly less than the inner diameter of the outer tube 30 and are secured to the latter such as by welding or the like. Each of the washers 18 has a central opening which is adapted to receive a connecting rod 16 in such a manner that the latter may be pushed into the central opening of the washers 18 but is prevented from being pulled out. To this end the washers 18 may be provided with a frusto-conical configuration disposed as shown in FIG. 1. With this arrangement it will be seen that the rod 16 may be readily pushed into the washer openings during assembly but when a force is applied to withdraw the rod 16, the edges of the washer opening will engage the rod 16 to prevent its withdrawal.

Figure 2:
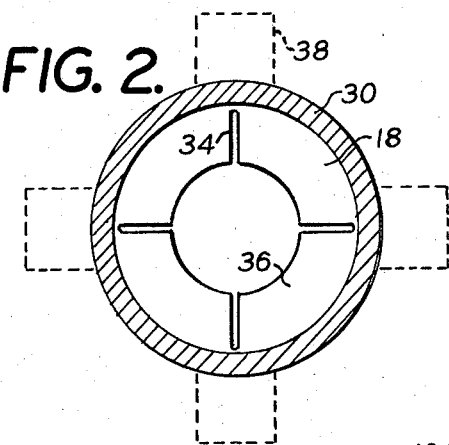
FIG. 2 is a sectional view taken along the line 2—2 of FIG. 1.

To facilitate engagement during any attempted withdrawal of the rod 16, the washers 18 may be provided with a central opening having a diameter just slightly less than the diameter of the rod 16 so that as the rod is pushed in the washer openings, the latter will be enlarged and in so doing will bear against the surface of the rod 16 with a biasing force to prevent its withdrawal. Suitable radial slits 34 may be provided in the washer 18 as shown in FIG. 2 to provide flexible tab 36 sections to facilitate enlargement of the washer opening and the subsequent grasping action during attempted withdrawal. Alternatively, the washers 18 may be secured in the outer tube 30 slightly askew so that a peripheral edge of the washer opening will engage the rod 16 during any attempted withdrawal. Also the rod 16 may be provided with a roughened or irregular surface to facilitate engagement with the washer opening during any attempted withdrawal.

Any desired number of tube means 20 are placed in desired array before the concrete is poured there around. In the embodiment of FIG. 1, there are four rods 16 disposed in four sets of tube means 20 although any other desired number may be used. Suitable receiving means such as V-shaped metal brackets 38 are secured such as by welding to the outer tube 30. When the concrete is poured around the brackets 38, the latter are encompassed and engaged by the concrete to precluded longitudinal withdrawal of the tube means 20 from the ends of the conduit sections 10, 11.

It will be seen that with the elements arranged as shown in FIG. 1, when the two conduit sections 10, 11 are moved towards one another, the rods 16 will be pushed into the tube means 20 to thereby secure and lock the two conduit sections 10, 11 to one another.

Figure 3:
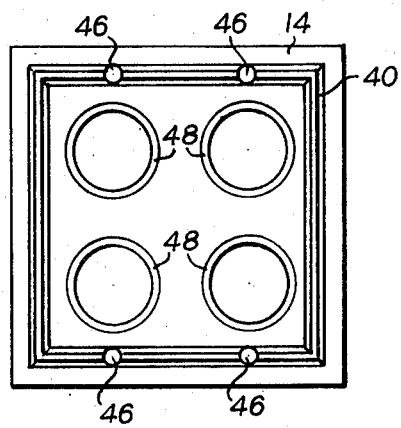
FIG. 3 is an elevational view of the gasket used in the sealing arrangement of FIG. 1.

The gasket 14 which is employed to provide a water tight seal comprises an outer main flange 40 which extends all around the gasket 14 as shown in FIG. 3. The main flange has tapered projections 42 which fit into corresponding and mating tapered indentations 44 in the longitudinal ends of the conduit sections 10, 11. At suitable spaced locations, openings 46 are provided in the main flange 40 to receive the connecting rods 16 as can best be seen in FIG. 1.

The gasket 14 is also provided with a circular flanges 48 each having a tapered section adapted to be disposed about each of the connecting sleeves 28 and which flanges 48 extend into the frusto-conical opening 26 in the longitudinal end of the conduit sections 10, 11. Thus the circular flanges 48 are wedged into the space 26 between the outside surface of the connecting sleeve 28 and the frusto-conical opening 22 in the conduit section when the two conduit sections 10, 11 are pushed together in their final, installed disposition.

Thus it will be seen that the main flange 40 of the gasket 14 seals the entire outer periphery of the coupling connection while each of the flanges 48 seal each of the conduits. The connecting sleeves 28 may be provided with tapered surfaces 50 to mate with the tapering surface 24 on the ends of the pipes 12 and thereby provide a greater contact area. Also the flanges 40 and 48 of the gasket 14 may be tapered to mate the tapered mating surfaces in the openings 44, 22 respectively of the ends of the conduit section 10, 11.

The above described arrangement provides a completely watertight connection which is rigid against a sheering action tending to displace one conduit section transversely of the other and which prevents the two conduit sections from coming apart or from being pulled apart longitudinally.

Figure 4:
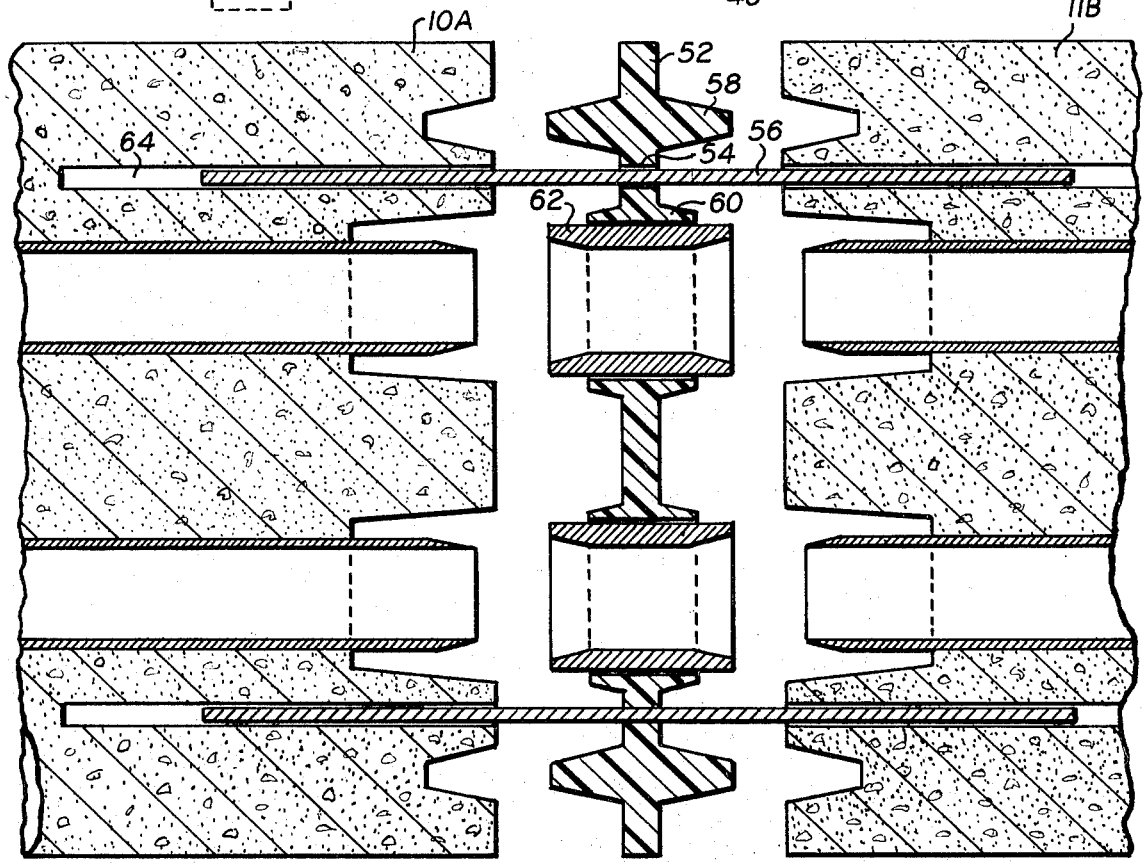
FIG. 4 is a partial, horizontal, longitudinal section of an alternate embodiment showing the ends of two conduit sections which are about to be joined to one or another.

FIG. 4 shows an alternate embodiment in which a gasket 52 is similar to the gasket 14 in the embodiments of FIGS. 1–3 except that openings 54 for connecting rods 56 are located in the gasket 52 in the space between the main flange 58 and the flanges 60 for the connecting sleeves 62. The spacing of the openings 54 for the connecting rods 56 are readily discernible upon viewing FIGS. 4 and 5. The connecting sleeves 62 are arranged and disposed relative to the gasket flanges 60 and the ends of the conduit sections, 10A, 11B similar to that previously described in connection with the embodiment of FIGS. 1–3.

Figure 5:
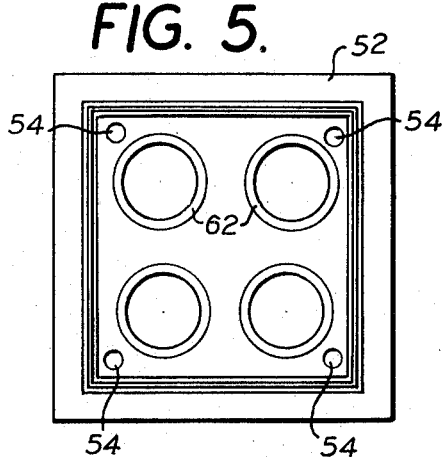
FIG. 5 is a view of the gasket used in the embodiment of FIG. 4.

In the embodiment of FIGS. 4 and 5 the connecting rods 56 are disposed in blind openings or passages 64 in the concrete and there are no tube means or locking means of the type provided in the embodiment of FIGS. 1 to 3. The connecting rods 56 provide a connection which is rigid against a sheering action tending to displace one conduit section transversely of the other.

Figure 6:
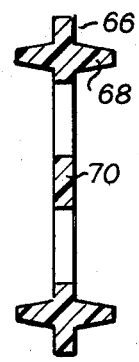
FIG. 6 is a sectional view of an alternate gasket which may be used in joining the longitudinal ends of the conduit sections.

FIG. 6 shows a further alternate embodiment wherein there is provided a gasket 66 similar to the gasket 52 in the embodiment of FIGS. 4 and 5 except that no flanges are provided around the connecting sleeves. In other words the portion of the gasket 66 between the connecting sleeves (for example connecting sleeve 62 in FIG. 4) and the main flange 68 is formed of a constant thickness as indicated at 70 in FIG. 6. The main flange 68 provides a water-tight seal around the periphery of the coupling while the portions of constant thickness 70 between the connecting sleeves seal the longitudinal ends of the conduit sections in the areas between the connecting sleeves.

Figure 7:
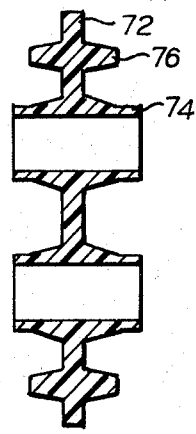
FIG. 7 is a sectional view of another alternate embodiment in which the connecting sleeves are formed integrally with the gasket.

FIG. 7 shows a further alternate embodiment wherein the gasket 72 and the connecing sleeves 74 are made integrally in one piece. In this embodiment, the need for separate connecting sleeves such as the sleeve 28 in FIG. 1 or 62 in FIG. 4 is obviated. The gasket 72 has a main flange as in the gasket 52 in the embodiment of FIG. 4.

Figure 8:
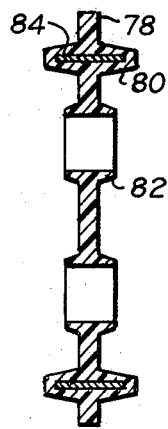
FIG. 8 is a sectional view of a further alternate embodiment in which a metal reinforcing band is incorporated within the gasket.

FIG. 8 shows another alternate embodiment where there is provided a gasket 78 having a main flange 80 extending all around the outer peripheral edge portion of the gasket 78 and a plurality of flanges 82 adapted to fit around the connecting sleeves as previously described. The gasket 78 in FIG. 8 differs from the previously described embodiments in that a steel band 84 is molded or otherwise embedded in the main flange 80. The main flange 80 provides a completely water tight connection while the steel band 84 in the main flange 80 provides a connection which is rigid against a sheering action tending to displace one conduit section transversely to the other.

Figure 9:
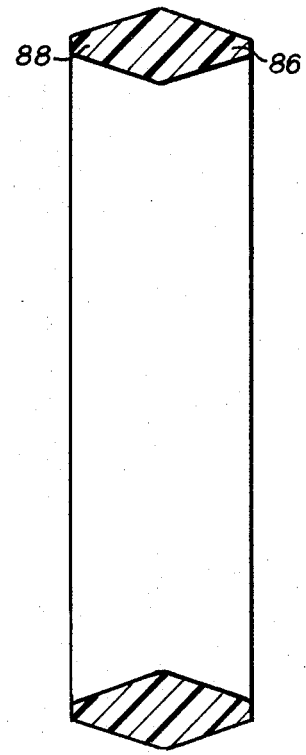
FIG. 9 is a sectional view of yet a further alternate embodiment showing a gasket which fits into a groove around the periphery of the longitudinal end of the preformed conduit.

In FIG. 9 there is shown a further alternate embodiment wherein there is provided a gasket having a main flange 88 formed as a closed ring. The main flange 88 portion fits into mating recesses in the longitudinal ends of the conduit sections 10, 11 to thereby provide a water tight seal around the periphery of the coupling.

Figure 10:
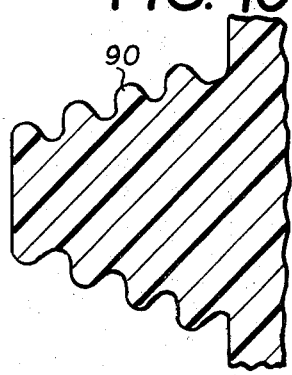
FIG. 10 is a partial sectional view of a portion of a gasket having a wave-like surface on the portion of the gasket which engages or contacts the concrete.
Figure 11:
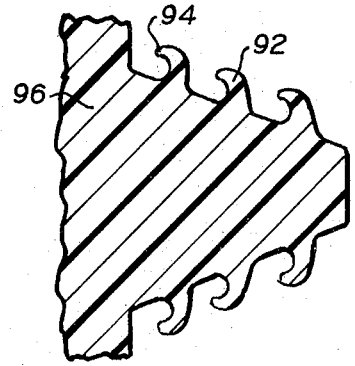
FIG. 11 is a partial sectional view similar to FIG. 10, but showing a ripple-type engaging surface on the gasket.

The gaskets shown in anyone of the embodiments hereinabove described may be provided with a steel band 84 of the type shown in FIG. 8. Also the flanges in each of the gaskets in all of the embodiments hereinabove described may be provided with an irregular wave-like surface 90 as shown in FIG. 10 or with a rippletype surface 92 as shown in FIG. 11. These two type surfaces 90 and 92 provide an additional flexibility which facilitates insertion of the tapered gasket flanges (for example flanges 58 and 60 in FIG. 4) in the correspondingly tapered openings in the longitudinal ends of the conduit sections. The ripple-like surface 92 has projections 94 which bend back toward the main body 96 of the flange. Accordingly, increased liquid pressure trying to enter the coupling will tend to force the projections 94 tighter against the concrete surface against which it is wedged.

Figure 12:
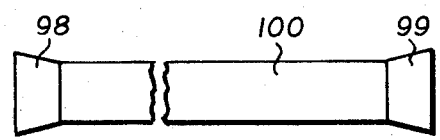
FIG. 12 is an elevational view of an alternate embodiment in which the longitudinal ends of the conduit sections are enlarged.

FIG. 12 shows a further alternate embodiment in which the longitudinal ends 98, 99 of a conduit section 100 are enlarged to provide the additional concrete for accommodating the locking means and tube means 20 shown in FIG. 1. Thus, the pipes 12 may be disposed close to the outer surface of the concrete section to the extent that there is not sufficient concrete between the pipes 12 and the outer surface of the concrete to provide adequate anchorage of the tube means 20 in the concrete. Enlarging the longitudinal ends of the concrete sections provides the additional concrete to obtain the desired strong and firm anchorage of the tube means 20 while permitting the longitudinal central portions of the pipes 12 to be located as close as desired to the outer surface of the concrete sections, thereby providing economy in the amount of concrete used without impairing the strength of the anchoring arrangement.

The gaskets hereinabove described may be made of rubber or plastic such as, for example, polyvinylchloride. The pipes 12 in the concrete conduit sections 10, 11, as well as the connecting sleeves 28, 62 may be made of various materials such as fiber, polyvinylchloride, transite steel, plastics (e.g., Bakelite, porcelin and the like). As an alternate arrangement, each conduit section 10, 11 may be made of one homogeneous material without pipes 12 encased therein.

It will be understood that although four pipes 12 are shown in the drawings any number of pipes may be used. Also instead of being square as illustrated, the cross section of the conduit sections may be circular or take on some other configuration.

It will be apparent that the above described conduit sections may be coupled or joined to one another to provide a completely water tight seal which is rigid against a sheering action tending to displace one conduit section transversely of the other and which prevents the two conduit sections from coming apart or from being pulled apart longitudinally.

It is thought that the invention and many of its attendant advantages will be understood from the foregoing description and it will be apparent that various changes may be made in the form, construction and arrangement of parts of the apparatus described herein, without departing from the spirit and scope of the invention or sacrificing all of its material advantages, the apparatus hereinabove described being merely a preferred embodiment.

What is claimed is:

1. A preformed conduit comprising a longitudinal extending body, a plurality of spaced pipes extending in said body substantially parallel to one another, a second longitudinal extending body substantially identical to the first said body and disposed in longitudinal alignment with said first body, each of said bodies having a plurality of passages axially aligned with each of said pipes and opening up to the respective longitudinal ends of said bodies, connecting sleeves disposed in said passages to couple the longitudinal ends of the pipes in said first and second bodies, and gasket means disposed and around the peripheral edge portion of the longitudinal ends of said bodies, said longitudinal ends of said bodies having opposed indentations in which said gasket means is disposed to form a water tight seal, said gasket means having a main flange disposed around the peripheral edge portion of the longitudinal ends of said bodies in the space between the pipes and the outer surface of said bodies, said gasket means having a metal element embedded therein and disposed to traverse said opposed indentations to provide rigidity against a shearing action tending to displace one of said bodies transversely of the other.

2. A preformed conduit according to claim 1 wherein said main flange has a tapered configuration.

3. A preformed conduit according to claim 1 wherein said main flange has an irregular surface.

4. A preformed conduit according to claim 3 wherein said irregular surface has projections which bend back to one side.

5. A preformed conduit comprising a longitudinal extending body, a plurality of spaced pipes extending in said body substantially parallel to one another, a second longitudinal extending body substantially identical to the first said body and disposed in longitudinal alignment with said first body, each of said bodies having a plurality of passages axially aligned with each of said pipes and opening up to the respective longitudinal ends of said bodies, connecting sleeves disposed in said passages to couple the longitudinal ends of the pipes in said first and second bodies, gasket means disposed around the peripheral edge portion of the longitudinal ends of said bodies, said longitudinal ends of said bodies having opposed indentations in which said gasket means is disposed to form a water tight seal, locking means disposed in the longitudinal ends of said bodies, said locking means including connecting rods extending between the two longitudinal ends of the bodies and tube means within each of the bodies for receiving said connecting rods, said tube means including washers which allow the connecting rod to be freely inserted therein but which prevents the connecting rod from being pulled out, said washers being mounted in said tube means and having a generally frusto-conical configuration, radial slits in said washers defining tab-like portions which biasingly engage said connecting rod, tube element means including a first tube element disposed in a portion of a second tube element, said first tube element having an inner diameter corresponding to the diameter of said rod to thereby form a guide for the rod, said second tube element being closed on one end, said washers being mounted in said second tube element between the closed end thereof and one longitudinal end of said first tube element, and means on said second tube element for anchoring the latter to said body.

6. A preformed conduit comprising a longitudinal extending body, a plurality of spaced pipes extending in said body substantially parallel to one another, a second longitudinal extending body substantially identical to the first said body and disposed in longitudinal alignment with said first body, each of said bodies having a plurality of passages axially aligned with each of said pipes and opening up to the respective longitudinal ends of said bodies, connecting sleeves disposed in said passages to couple the longitudinal ends of the pipes in said first and second bodies, and gasket means disposed around the peripheral edge portion of the longitudinal ends of said bodies, said longitudinal ends of said bodies having opposed indentations in which said gasket means is disposed to form a water tight seal, said gasket means having a main flange disposed around the peripheral edge portion of the longitudinal ends of said bodies in the space between the pipes and the other surface of said bodies, said main flange of said gasket means having openings through which connecting rods pass.

7. A preformed conduit comprising a longitudinal extending body, a plurality of spaced pipes extending in said body substantially parallel to one another, a second longitudinal extending body substantially identical to the first said body and disposed in longitudinal alignment with said first body, each of said bodies having a plurality of passages axially aligned with each of said pipes and opening up to the respective longitudinal ends of said bodies, connecting sleeves disposed in said passages to couple the longitudinal ends of the pipes in said first and second bodies, and gasket means disposed around the peripheral edge portion of the longitudinal ends of said bodies, said longitudinal ends of said bodies having opposed indentations in which said gasket means is disposed to form a water tight seal, said gasket means having a main flange disposed around the peripheral edge portion of the longitudinal ends of said bodies in the space between the pipes and the outer surface of said bodies, said gasket means having openings between said gasket main flange and said connecting sleeves through which connecting rods pass.

* * * * *